United States Patent
Cristea

(10) Patent No.: US 12,120,168 B1
(45) Date of Patent: Oct. 15, 2024

(54) SCALABLE LIVESTREAM AUGMENTATION SYSTEM

(71) Applicant: 1337, Inc., Falmouth, MA (US)

(72) Inventor: Andrei Cristea, Falmouth, MA (US)

(73) Assignee: 1337, Inc., Falmouth, MA (US)

( * ) Notice: Subject to any disclaimer, the term of this patent is extended or adjusted under 35 U.S.C. 154(b) by 0 days.

(21) Appl. No.: 18/228,539

(22) Filed: Jul. 31, 2023

(51) Int. Cl.
  *H04L 65/75* (2022.01)
  *H04L 65/752* (2022.01)

(52) U.S. Cl.
  CPC .......... *H04L 65/764* (2022.05); *H04L 65/752* (2022.05)

(58) Field of Classification Search
  CPC ............................ H04L 65/764; H04L 65/752
  See application file for complete search history.

(56) References Cited

U.S. PATENT DOCUMENTS

| | | | | |
|---|---|---|---|---|
| 11,514,948 B1 * | 11/2022 | Nair | .............. | G06F 16/2365 |
| 2017/0212788 A1 * | 7/2017 | Zeng | .............. | G06F 9/4881 |
| 2019/0364303 A1 * | 11/2019 | Zhu | .............. | H04N 21/2368 |
| 2020/0336796 A1 * | 10/2020 | Hu | .............. | H04N 21/4307 |

\* cited by examiner

*Primary Examiner* — Andrew C Georgandellis
(74) *Attorney, Agent, or Firm* — Schwegman Lundberg & Woessner, P.A.

(57) ABSTRACT

Systems and methods are described that include receiving, at a streaming server, a data stream; upon determining, by the streaming server, a transformation to be applied to the data stream, transmitting the data stream to a processing server and applying, using the processing server, the transformation to the data stream; generating a transformed data stream for use by a platform. Systems and methods can include applying, using a determined number of processors, the transformation to a plurality of data stream samples, each processor of the determined number of processors applying the transformation to a data stream sample and generating a transformed data stream sample. Systems and methods can apply, using a processor, the transformation to a plurality of data stream sample sequences and generate corresponding transformed data stream sample sequences. Determining the number of processors can be based on a latency budget value and/or an attribute value of the transformation.

18 Claims, 7 Drawing Sheets

SCALABLE LIVESTREAM AUGMENTATION SYSTEM

TECHNICAL FIELD

The present disclosure relates generally to data stream processing and more specifically to a system for scalable livestream transformation and/or augmentation.

BACKGROUND

Given the popularity of live-streaming events such as entertainment events, athletic events, or video game playing sessions, there is a need to enable scalable, nearly real-time transformations and/or augmentations of livestreams in order to improve the experience of streaming, viewing, or participating users and better meet the needs of streaming services or other third parties.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
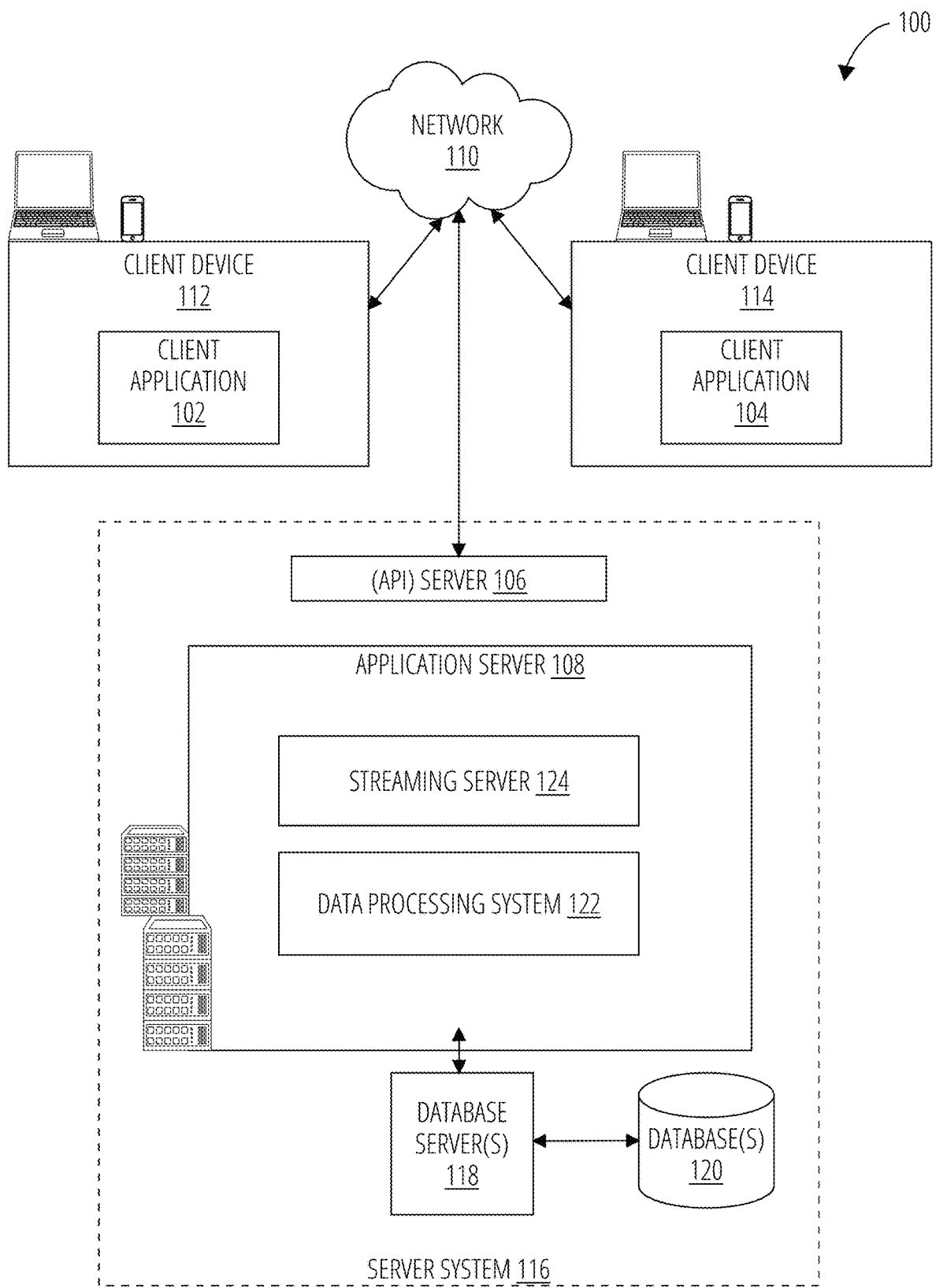
FIG. 1 is a block diagram illustrating a stream augmentation system, according to some examples.

Given the popularity of livestreaming events—ranging from entertainment and athletic events to video game playing sessions—there is a need to enable scalable, nearly real-time transformations and/or augmentations of livestreams to improve the experience of streaming or viewing users and to better meet the needs of streaming services and various other parties. For example, viewing users can benefit from a translation of a stream into their language, or they can enjoy watching a video stream partially customized according to a viewer specific request. Streaming users (streamers) can financially benefit from allowing a third party to donate or pay in order to insert specific content in an organic fashion in a particular live stream. Streaming services and other parties can enforce service-specific content moderation policies, or apply service-specific, potentially proprietary transformations to various streams to offer customized experiences to users.

According to certain embodiments, a transformation refers to the process of altering or augmenting livestream data by incorporating additional multimedia elements (i.e., augmentations). This may, for example, include enriching the livestream with supplementary visual or audio content to enhance the viewer's experience. In some embodiments, transformations include other modifications to livestream data, such as eliminating selected video frames or selected audio samples, and so forth. Nearly real-time livestream transformations require the ability to process one or more data streams in an efficient and scalable fashion, while accommodating transformations with differing computation requirements or running times. Ideally, a system for livestream transformations should allow transformations to be requested or provided in multiple ways such as by the streaming user, by the viewing user, by a streaming platform or other third party, and so forth. Furthermore, architecture choices pertaining to a system for livestream transformation must take into account compute constraints of the devices used by the streaming users (streamers). For example, such devices may not be able to directly apply a transformation, such as a special effect, to a stream, in addition to broadcasting the stream and running other applications. Device-side application of transformations may therefore result in an unwelcome slowdown of other applications, and potentially of the stream broadcast itself. Additionally, applying transformations at the origin (that is, on a streamer's device) may contravene instructions from a third party needing to make sure a particular content blocker or specific ML model with certain performance guarantees is applied to a livestream. In some cases, transformation-related models may be proprietary or have onerous installation and deployment requirements. Such use cases can require professional assistance and assurance from a third party, such as a dedicated livestream transformation service, that the desired transformation will be applied in a robust and consistent fashion that does not publicize potentially proprietary information. Furthermore, streamers themselves may prefer entrusting livestream transformations or augmentations to a third-party platform.

A system for livestream transformation must also account for supply limitations that can prevent a server-based solution from utilizing scarce graphics processing unit (GPU) resources and cause it to make use of weaker, but widely available processors. To further reduce compute-related expenses, solutions that pool resources across livestreams, and therefore minimize idle compute time, are preferable. Finally, a system can seek to further reduce compute-related expenses by minimizing or avoiding unnecessary computation, such as, for example, decoding and re-encoding a data stream, during broadcast periods not associated with any requested or needed transformation.

Example embodiments in the disclosure herein describe a resource-efficient, dynamic and scalable system and method for deploying data processing models, including but not limited to video or audio processing models to transform or augment content within one or more livestreams.

An example system comprises a streaming server that receives a data stream. The data stream may be a video stream, an audio stream, a multimedia stream, and so forth, that may be received from a streaming user. In some examples, the streaming server determines that a transformation or augmentation should be applied to the data stream. By applying the transformation using a dedicated server, rather than at a streamer's device, an example system mitigates compute constraints of the streamer device and can apply complex or compute-intensive transformations as needed. For example, the transformation may correspond to identifying particular objects and modifying them in real-time, such as applying a face filter to modify a streamer's face or applying a branded content filter to re-texture an object from an original video stream as an advertisement. In other examples, the transformation may correspond to identifying and blocking profane or obscene content detected within the livestream. In some examples, determining the transformation to be applied to the data stream is based on the streaming server receiving a request or instruction to apply a selected transformation of a set of available transformations to the data stream. Example requests include a streamer's request triggered by a viewer donation in a chat channel, a request by a paying third party, a request from an end platform or streaming service, an instruction based on an internal policy of the streaming server that covers the preemptive filtering of undesirable content such as copyrighted content or mature content, and so forth.

Example embodiments comprise, upon determining a transformation to be applied to the data stream, transmitting the data stream to a processing server (a component of the streaming server), which applies the transformation to the data stream and generates a transformed data stream. The streaming server then transmits the transformed data stream to one or more end platforms and/or users. In some examples, the streaming server determines that an application period associated with a specific transformation has ended, or that no transformation need be applied, in which case the data stream can be directly forwarded to one or more end platforms instead of undergoing additional processing, which can incur additional compute costs.

In some examples, the processing server can determine that an input data stream should be demultiplexed and/or decoded. For example, demultiplexing an input multimedia data stream results in multiple individual data streams of particular types, such as a video stream and an audio stream. In some examples, the input data stream has undergone encoding or compression for transmission efficiency purposes and the processing server decodes it so it can transform or augment the raw data. After the processing server has finished transforming or augmenting one or more raw data streams, it can re-encode and/or multiplex them, generating a unified transformed multimedia stream to be sent to the one or more end platforms or users.

In some examples, applying a transformation and/or augmentation to the data stream involves running a model, such as a machine learning model, on samples of the data stream. In some examples, deployable models, together with configuration information or additional assets, are locally available on a streaming server. In some examples, the models can be obtained via an application programming interface (API) or be explicitly provided by a streaming user, by an end platform or third party, and so forth.

In some examples, the processing server applies a transformation to the data stream using an automatically determined number of processors that process, in parallel, data stream samples (for example, individual video frames or audio samples). In some examples, applying the selected transformation to the data stream comprises a sequential processing step, during which the processing server processes a sequence of data stream samples (for example, a set of consecutive video frames, or a set of consecutive audio samples). In some examples, the inputs to the sequential processing step are outputs of the parallel processing step; for example, in the case of a system that tracks an object, frame-level tracking outputs can be reconciled and/or smoothed using a window of a predetermined number of consecutive frames.

In some examples, the livestream augmentation system automatically determines the number of processors for parallel processing of data stream samples based one or more factors, such as an overall number of available processors (i.e., a pool size), a known latency budget corresponding to how many seconds can be added to the livestream to apply a transformation, values of attributes of a selected transformation, such as the speed of applying the transformation to one video frame, the transformation's requirement of a post-processing step for data stream sample sequences, and so forth. In some examples, the streaming server uses a first part of a provided latency budget for the parallel processing of individual data samples such as video frames, and the remainder of the latency budget to integrate or combine the output of frame-level processing and ensure the augmented or transformed stream is smooth from a frame to the next (for example, by eliminating jitter or noise). By automatically determining the number of processors, the livestream augmentation system can dynamically change the configuration of the parallel processing step as needed and/or more efficiently spend the available latency budget. Additionally, by allocating more compute resources, when available, to the parallel processing module, the total latency of the system can be reduced to approach, as a lower bound, the time it takes to process a single raw data sample or item. In some examples, adding computing power to the server also allows for increasing the number of simultaneously processed streams. The system may optimize commercial considerations such as cost and compute supply, as it can use many inexpensive, if weak, processors to achieve the same speed as a significantly more powerful processor, which may be unavailable or prohibitively expensive.

FIG. 1 is a block diagram showing an example stream augmentation system 100. The stream augmentation system 100 includes one or more client devices (e.g., client devices 112 and 114) that host a number of applications including client applications 102 and 104. For purposes of explanation, client device 112 and client application 102 may refer to a "streamer device" and a "livestreaming application," while client device 114 and client application 104 may refer to a "viewer device" (or a "end-user device") and another instance of a "livestreaming application" or a "social media application." As detailed above, an augmentation is one common example of a transformation, and an example stream augmentation system 100 is a non-limiting example of a stream transformation system.

Each client application (e.g., 102) is able to communicate and exchange data with another client application (e.g., 104) and with the streaming server application executed at a server system 116 via a network 110. The data exchanged between client applications, and between a client application (e.g., 102 or 104) and the server system 116, includes functions (e.g., commands to invoke functions) as well as payload data (e.g., text, audio, video or other multimedia data).

The server system 116 provides server-side functionality via the network 110 to client applications 102 and 104. While certain functions of the stream augmentation system 100 are described herein as being performed by either client application 102 and 104 or by the server system 116, it will be appreciated that the location of certain functionality either within a client application or the server system is a design choice. For example, it may be technically preferable to initially deploy certain technology and functionality within the server system 116, but to later migrate this technology and functionality to client applications 102 or 104, where there may be sufficient processing capacity. In some examples, the server system 116 may interact with additional platforms or server systems that in turn directly interact with client applications 102 and 104. For example, a server system 116 may interact with an external platform such as Twitch or Facebook, associated with instances of corresponding client applications on individual client devices. In some examples, the server system 116 may be part of a streaming-enabled system or platform (such as Twitch). In such cases, various services and operations described below as provided by the server system 116 to client applications are instead performed by the server system 116 for the benefit of the respective streaming-enabled system or platform. More details about example configurations can be found at least in the description of FIG. 2.

In some examples, the server system 116 supports various services and operations that are provided, for example, to client applications (e.g., 102 or 104). Such operations include transmitting data to, receiving data from, and processing data generated by the client applications. In some embodiments, this data includes, video and audio data, message content, device information, geolocation information, persistence conditions, social network information, sensor data, and live event information, as examples. In other embodiments, other data is used. In some embodiments, data exchanges within the stream augmentation system 100 are invoked and controlled through functions available via graphical user interfaces (GUIs) of the client applications 102 and 104. In some embodiments, data exchanges within the stream augmentation system 100 take place subsequent to requests by a platform, which can be an external platform or directly include (or overlap with) the stream augmentation system 100.

Turning now specifically to the server system 116, an API server 106 is coupled to, and provides a programmatic interface to, an application server 108. The application server 108 is communicatively coupled to database server(s) 118, which facilitate access to one or more database(s) 120 that store data associated with data generated by client applications 102 and 104 and processed by the application server 108.

Dealing specifically with the API server 106, this server receives and transmits data (e.g., commands, and payloads) between client devices 112 and 114 and the application server 108. Specifically, the API server 106 provides a set of interfaces (e.g., routines and protocols) that can be called or queried by the client applications 102 and 104 in order to invoke functionality of the application server 108. The API server 106 exposes various functions supported by the application server 108, including account registration; login functionality; the transmission of data, via the application server 108, between client applications; the sending of data (e.g., text, images, video, geolocation data, etc.) from a client application 102 or 104 to the streaming server 124, and for possible access by another client application; the setting of a collection of data; the retrieval of such collections; the retrieval of data; and the location of devices within a region.

The application server 108 hosts a number of subsystems and/or applications, including a streaming server 124 and a data processing system 122. In certain embodiments, the streaming server 124 may be architecturally incorporated as a logical partition within the application server 108. This setup employs a degree of server virtualization, treating the streaming server 124 as a virtual server residing within the application server 108. Conversely, in other configurations, the streaming server 124 could be delineated as a standalone server entity, executing independently, and further emphasizing the potential for physical or network partitioning in the server infrastructure.

The streaming server 124 implements a number of data processing technologies and functions particularly related to the accessing, creating, updating, and other processing of data (e.g., video and audio streams), for example, by client application 102 or 104. Other processor and memory intensive processing of data may also be performed server-side by the streaming server 124, in view of the hardware requirements for such processing.

The data processing system 122 implements a number of technologies and functions, particularly related to generating, accessing, updating, and aggregating data generated or processed by client applications (such as 102 or 104), or by applications and subsystems of server system 116. Some or all of the functionality of the data processing system 122 may be incorporated into the streaming server 124.

The application server 108 is communicatively coupled to one or more database server(s) 118, which facilitate access to one or more database(s) 120 storing data associated with data generated or processed by client applications 102 and 104 and by one or more applications and subsystems of server system 116. In some embodiments, one or more of the database(s) 120 may be a hypergraph database (e.g., TypeDB). In some embodiments, one or more of the database(s) 120 may be a relational database (e.g., a SQL database such as MYSQL, etc.) or a non-tabular database (e.g., a NoSQL database such as MongoDB, etc.).

Figure 2:
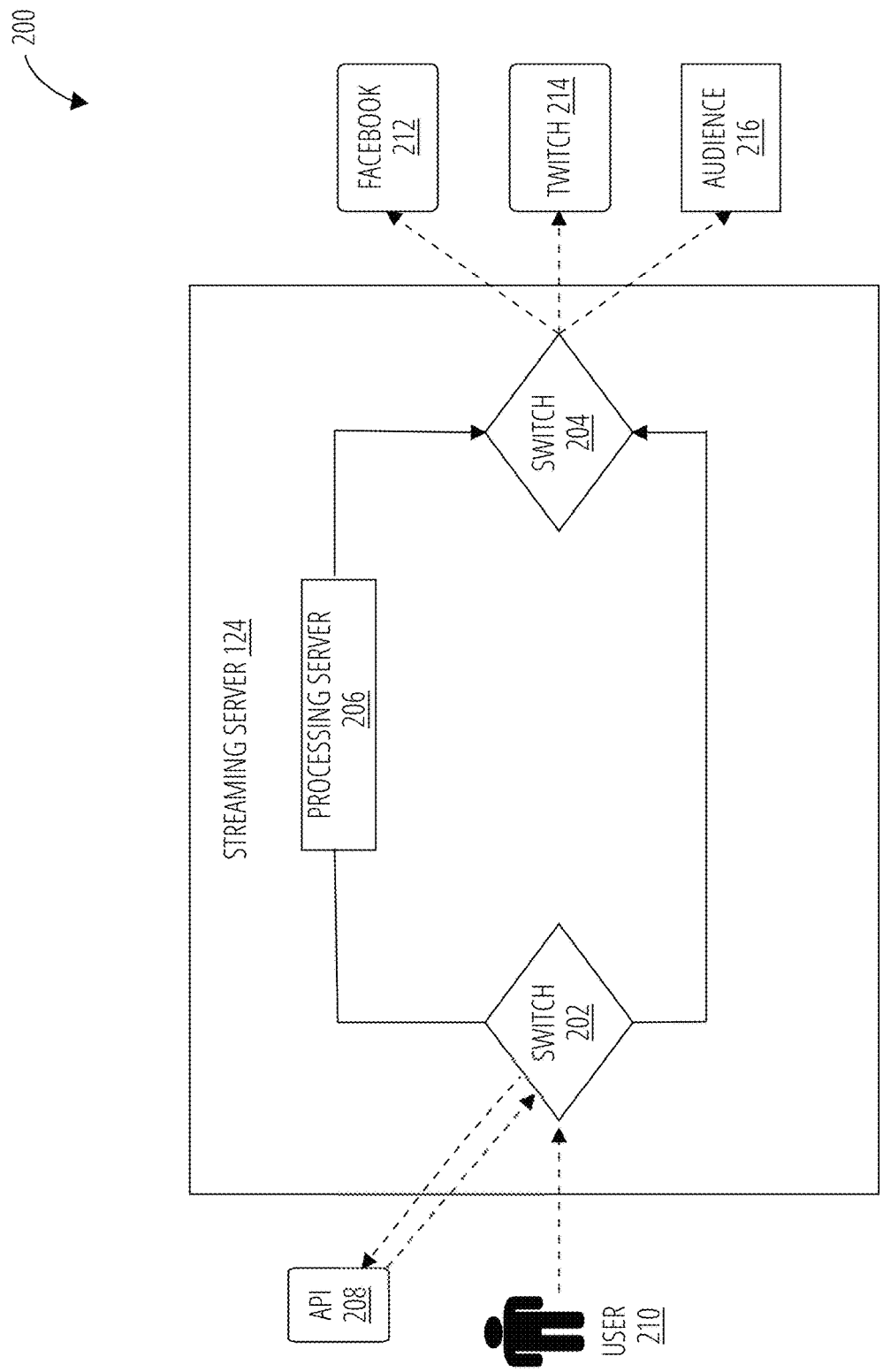
FIG. 2 is a diagrammatic representation of a streaming server, according to some examples.

FIG. 2 is a diagrammatic representation 200 of a streaming server 124, according to some examples, which is a component of a stream augmentation system 100. A user 210 authenticates and broadcasts a data stream, or a signal, to a streaming server 124. In some examples, the user 210 broadcasts the data stream or signal via broadcast software, using a transmission technology such as Real-Time Messaging Protocol (RTMP), HTTP Live Streaming (HLS), Secure Reliable Transport (SRT) Protocol, Dynamic Adapting Streaming over HTTP (also known as MPEG-DASH), and so forth. In some examples, one or more users broadcast multiple data streams via broadcast software to the streaming server 124.

The streaming server 124 includes a switch 202, which decides whether an incoming data stream will be processed further or directly forwarded to an end destination, such as an external service or an internal service. The switch 202 may communicate with an API 208 to make this decision. If the switch 202 indicates the data stream should be processed further, the stream will be sent to a processing server 206 of the streaming server 124 (see FIG. 3 for details). If the switch 202 indicates the data stream should be directly forwarded to an end destination, the streaming server 124 bypasses the processing server 206 and performs a forwarding operation (in some examples, the forwarding operation includes a delay). The processed or unprocessed data stream will eventually be transmitted to one or more end destinations via a switch 204. An end destination may be an external service, such as Twitch (see element 214), YouTube (Gaming), Facebook or Facebook Live (see element 212), Vimeo, and so forth, or an internal service that distributes the augmented video stream to a viewing audience 216. For example, the livestream stream augmentation system 100 described herein can be implemented within a streaming service or platform such as Twitch, etc.

The processing server 206 performs decoding operations, transformations, augmentations, or re-encoding operations, which can be computationally expensive. The switch 202, for example using the API 208, allows the streaming server 124 to toggle between a processing path (e.g., using the processing server 206) and a forwarding path, including directly forwarding the data stream to the one or more of the end destinations. In some examples, the switch 202 makes this decision in a dynamic fashion, for example, even before a user's inbound connection is established, as seen below. As mentioned above, the API 208 can be used to make a decision with respect to the data stream being either processed or directly forwarded to an end destination. In some examples the API 208 is an external API. In some examples, the API 208 and/or the switch 202 monitor the existence and parameters of incoming requests in order to determine whether, at a particular time, the streaming signal should be transformed or augmented. In some examples, the switch 202 and/or API 208 determine that a data stream comprising video frames and audio signal is not subject to any processing requests (such as a request to transform either the video or audio components of the stream), and can therefore be forwarded to one or more of the end destinations without being processed by the processing server 206. In some examples, the API 208 is an API to either an external system, or to a component of the stream augmentation system, which performs a matching between available resources of the stream augmentation system 100 and demands of third-parties such as users, content creators, paying entities, and so forth. For example, the stream augmentation system 100 may have a number of available slots for placing branded content, and allocate a subset of the available slots for a predetermined period of time to one or more third parties. In some examples, the slots may be available across one or more data streams, or one or more game-playing sessions.

In some examples, the API 208 uses information related to a third-party having performed a specific transaction, such as paying to insert branded content into a stream. In some examples, a viewing audience member may donate money in exchange for a desired transformation or augmentation to be applied to the stream. For example, a user may donate in order to replace a streamer's face with an avatar of the user's choice. In another example, the streamer's appearance may be transformed by means of a transformation function selected by the user from a set of available transformation functions. In some examples, the switch 202 and/or API 208 track the duration of one or more desired transformations or effects, and upon determining that a predetermined application period has expired, trigger the removal of the transformation and/or effect from the data stream. In some examples, the switch 202 (potentially using API 208) may indicate the remainder of the incoming stream can be switched from the processing path to a direct forwarding path (for example, if no additional transformations or effect need be applied to the stream at this time or in the near future). In some examples, a third-party, such as a user, other content creator, customer, service or platform, and so forth, can submit requests with respect to one or more specific transformations, one or more stream slots where an augmentation can be applied, one or more durations of which to apply a selected transformation, or one or more triggers for applying the transformation. Example triggers can be time-based or location-based, for example, related to inserting recreation-related branded content every Friday or Saturday evening, or inserting location-specific branded content based on user geolocation. In some examples, one or more of the switch 202 and API 208 detect that stream-related transformation requests come from the stream augmentation system 100 itself. For example, the system or platform may want to proactively use safety-related filters or transformations (i.e., an obscenity filter, a nudity blocker, and so forth). In some examples, the switch 202 and API 208 detect that the stream-related transformation requests come from one or more of the end platforms (e.g., a platform may want to use its custom, more aggressive, obscenity blocking filter).

Figure 3:
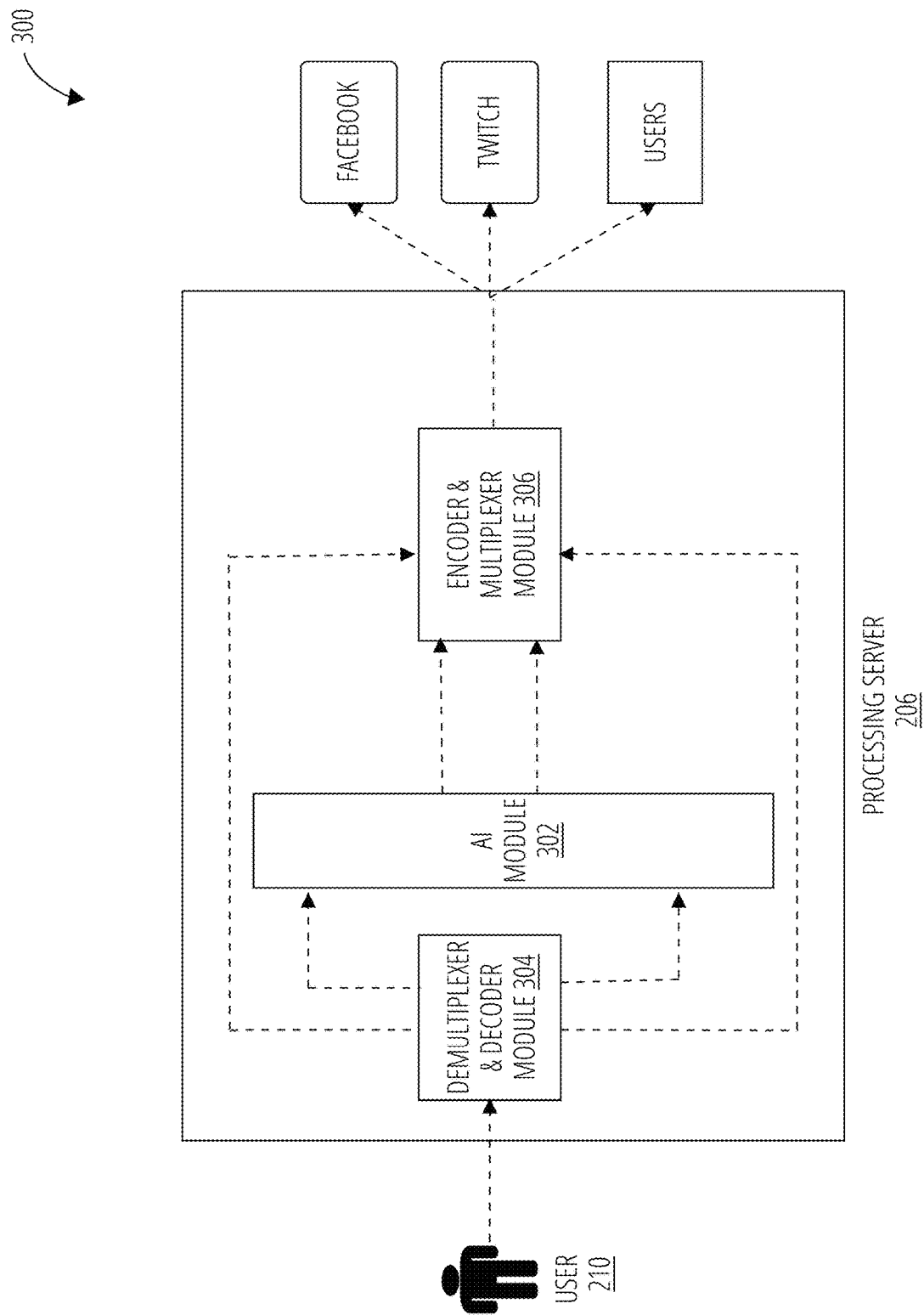
FIG. 3 is a diagrammatic representation of a processing server, according to some examples.

FIG. 3 is a diagrammatic representation 300 of a processing server 206, according to some examples, which is a component of the streaming server 124. The processing server 206 includes a demultiplexer & decoder module 304, an AI module 302 and an encoder & multiplexer module 306. In some examples, the processing server 206 may include fewer or additional modules, the components and/or functionalities of the included modules may overlap or be shared, some of the modules may be components of other modules, and the data flows may vary with respect to the example(s) discussed below, as would be expected or understood by one skilled in the art, without departing from the scope of the disclosure.

As described in FIG. 2, user 210 broadcasts a data stream to a streaming server 124, which can determine that the data stream needs to be further processed, for example, by the processing server 206. In some examples, the data stream broadcast by user 210 is a multimedia signal. In some examples, the multimedia signal may have been multiplexed, for example, after compression coding. In some examples, the multimedia signal is processed by a demultiplexer component which is, in an example configuration, part of a demultiplexer & decoder module 304. The result of the demultiplexer processing step is the generation, by the demultiplexer & decoder module 304, of multiple data streams or signals (for example, an audio stream and a video stream, comprising audio samples and/or video frames). In some examples, an incoming data stream such as a multimedia signal has been encoded (for example, using compression encoding) before being transmitted. If so, the demultiplexer & decoder module 304, for example, using a decoder component, can transform the corresponding encoded signals (encoded video stream, encoded audio stream, etc.) into raw stream data such as raw video frames or raw audio samples.

In some examples, the raw stream data is sent by the demultiplexer & decoder module 304 to the AI module 302. The AI module 302 processes the raw frames and/or samples as further detailed in FIG. 4 and sends the processed stream data to the encoder & multiplexer module 306. In some examples, a re-encoder component of the encoder & multiplexer module 306 encodes the processed frames and/or samples. In some examples, the encoder component may use a high efficiency coding method such as the MPEG method standardized by ISO/SC29/WG 11. In some examples, a multiplexer component of the encoder & multiplexer module 306 multiplexes separate data streams (such as the audio and video streams) and outputs a combined, multimedia stream. In some examples, the multimedia stream includes one or more processed or encoded video and audio stream data.

In some examples, the functions of the demultiplexer & decoder module 304 may be explicitly separated and performed by a demultiplexer module and a decoder module. In some examples, the functions of the encoder & multiplexer module 306 may be explicitly separated and performed by an encoder module and multiplexer module.

In some examples, a transformation is to be applied to video frames, while the audio is not affected. The processing server 206, using, for example, the demultiplexer & decoder module 304, can demux the audio signal and forward it to encoder & multiplexer module 306 without decoding it. By doing so, the system saves time that would be spent decoding and reencoding an audio signal to which no transformation need be applied. The raw, demuxed, and/or decoded video signal or video stream is sent to the AI module 302 in order for the transformation(s) to be applied.

In some examples, a transformation is to be applied to audio samples, while video frames are unaffected. The processing server 206, using, for example, the demultiplexer & decoder module 304, can demux the video signal and forward it to encoder & multiplexer module 306 without decoding it, resulting in time savings due to avoiding decoding and reencoding the video. The raw, demuxed audio signal is sent to the AI module 302 in order for the transformation(s) to be applied. In some examples, the pair of dotted lines in FIG. 3 directly connecting demultiplexer & decoder module 304 to encoder & multiplexer module 306 illustrate above mentioned demuxed (but not decoded) video or audio signals, which are not processed by the AI module 302.

In some examples, a transformation affects both video frames and audio samples, in which case both raw video and audio streams (raw data streams) will be sent to the AI module 302 in order for the transformation to be applied.

In some examples, the streaming server 124 starts with a predetermined overall latency budget. In some examples, a latency budget corresponds to a number of seconds that can be added to the input stream or signal while re-streamed by the streaming server 124. The processing server 206 is similarly allocated a latency budget (part of the overall latency budget). In some examples, the processing server 206 uses information about the speed of potentially necessary operations such as demultiplexing, multiplexing, encoding, and decoding operations to determine a latency budget for the AI module 302 (see at least FIG. 4 for the use of such a budget by the AI module 302).

In some examples, the processing server 206 may generate multiple versions or multiple copies of an incoming data stream and selectively apply one or more transformations to one or more of the data stream versions or copies. For example, different end platforms may have different versions of content filters that should be applied, and each end platform will receive a version of the data stream appropriately filtered. In another example, a viewer on a particular platform has won a platform-specific bid for a particular avatar to be applied to the streamer's face; the appropriately transformed data stream should only be transmitted to the relevant platform. In some examples, an end platform will receive a filtered version or copy of a data stream, while other end platforms will receive unfiltered remaining versions or remaining copies of the data stream.

Figure 4:
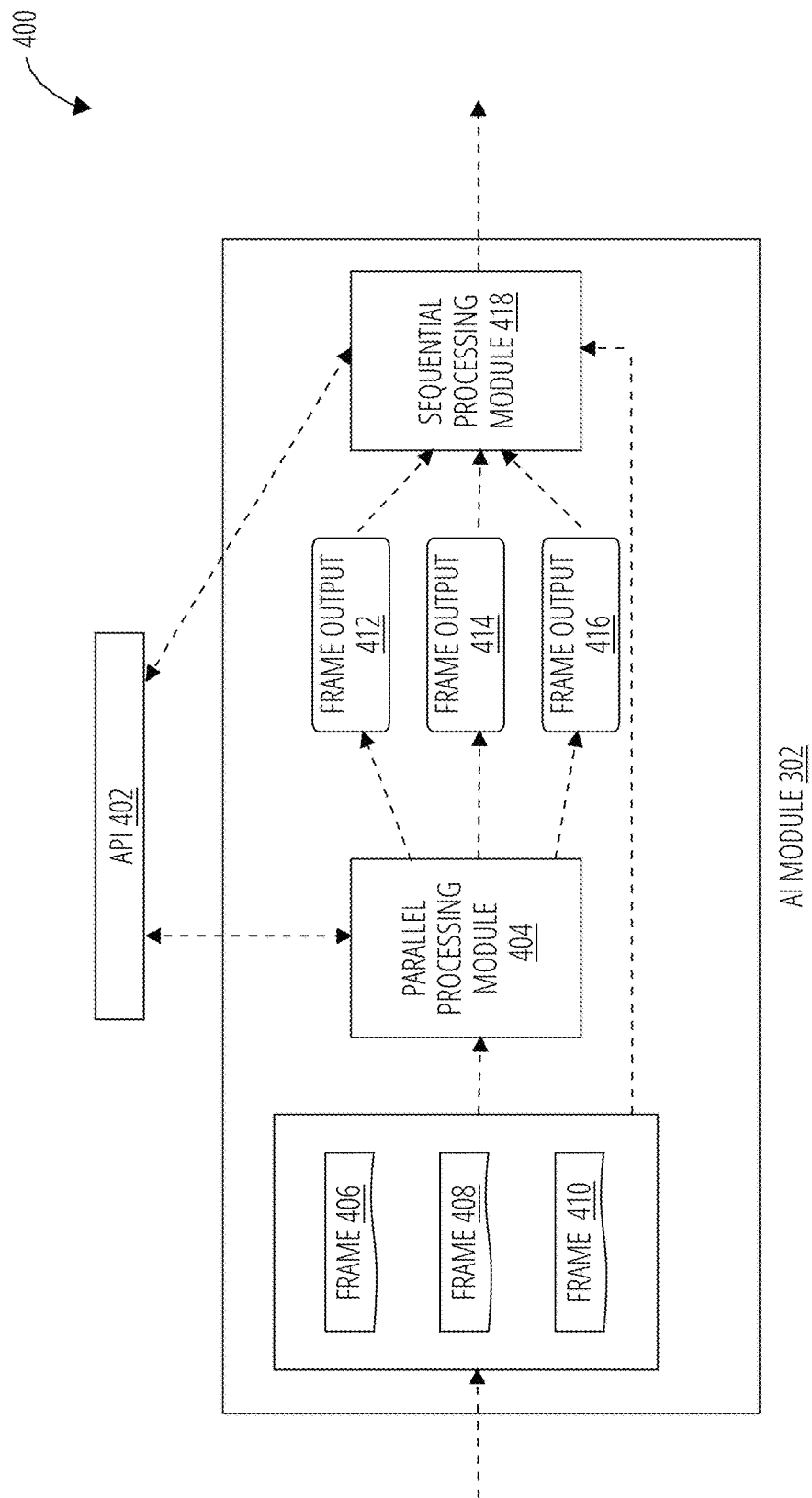
FIG. 4 is a diagrammatic representation of an artificial intelligence (AI) module, according to some examples.

FIG. 4 is a diagrammatic representation 400 of an AI module 302, according to some examples, which can be a part of the processing server 206. The AI module 302 receives, as input, raw stream data, including video frames (for example, frame 406, frame 408, frame 410) and/or audio samples. The raw stream data is sent to a parallel processing module 404, which performs a set of data processing operations, applying, for example, image processing or computer vision models, audio signal processing operations, and so on. In some examples, the data processing operations are performed locally, on a computing device's CPU(s) or GPU(s). In some examples, data processing operations may be performed remotely, for example, on cloud-hosting computing resources (see below for more details).

In some examples, the parallel processing module 404 uses one or more pre-trained ML models. In some examples, model files, including model configuration files that specify parameter values, running setup information, and so forth, are updated on a predetermined schedule (for example, daily or weekly). In some examples, instructions regarding the specific data processing operations to apply, and/or relevant model files, are received or updated via a connection with an API 402. The API 402 can be an external API. The API connection enables the parallel processing module 404 to update data processing models dynamically, for example, during a live user broadcast.

In some examples, the API 402 may trigger the application of one or more desired effects or transformations, such as instructing a parallel processing module 404 to apply a face filter to the identified face of a streamer. In some examples, the API 402 may be queried for and/or send over a particular model file, information corresponding to a model version, and/or set of parameters. In some examples, the API 402 may be queried for and/or send over to the AI module 302 data files or asset files corresponding to specific textures, filters, animations, AR (or ER) effects and/or other effects to be applied to or inserted into a stream. In some examples, asset files may be image files with one or more common formats (.gif, .jpg, .png,), video files (with formats such as MP4, MOV, WMV, FLV, AVI, AVCHD), audio files (with formats such as MP4A, MP3, AAC, WAV/AIFF, FLAC, Ogg Vorbis, PCM, ALAC, etc.) In some examples, the API 402 may be queried for and/or send over to the AI module 302 one or more parameters of a target augmentation or transformation. Examples of such parameters include version number of a target augmentation or transformation, degree/intensity/sensitivity (selected amongst a predetermined set of transformation-related property values for each specific property, whether categorical or numerical), as well as transformation-specific parameters and corresponding values.

The API 402 can transmit metadata, such as game or stream identification information, streamer-related information, stream audience statistics (number of current viewers for a given stream, median viewing time or average viewing session length for viewers during a predetermined period of time (e.g., during the past 60 mins), and so forth). In some examples, the AI module 302 can use such metadata, such as, for example, stream or user identification information, to retrieve one more models and one or more asset files corresponding to transformations to be applied to a stream. In some examples, the AI module 302 can perform this retrieval by further querying the API 402, while in some examples, the models and/or asset files are available locally (for example, on the processing server 206).

In some examples, the AI module 302 responds to an external trigger, such as, for example, the streaming server 124 receiving a donation or a request from a platform API, monitoring a viewer chat and detecting a donation being pledged or made in a chat session, and so forth. In response to the streaming server 124 receiving or detecting a relevant request or donation, the processing server 206 can instruct the AI module 302 to apply a relevant or requested contextual augmentation or transformation to the stream. In some examples, the duration of a transformation is a predetermined duration (for example, applying a specific effect for a given amount of time, according to a paid amount and a particular rate). In some examples, a transformation has a dynamically determined duration, where the end of applying the transformation may be, for example, based on the streaming server 124 detecting a relevant stop request or an external trigger corresponding to a termination trigger. The streaming server 124 (for example, via the AI module 302, as detailed herein) can detect in-frame or frame-related triggers or signals corresponding to applying a particular transformation (given, for example, a standing content filtering policy to cover up or mute certain content, and so forth).

In some examples, the AI module 302 applies a given transformation, such as a dynamically requested transformation or a transformation required by a standing policy, to a data stream by using the parallel processing module 404. In some examples, the AI module 302 applies the transformation by using the parallel processing module 404 to run a corresponding ML model on each individual frame or each individual sample of a set of frames or samples. In some examples, the AI module 302 runs the corresponding ML model for the target transformation on a sample of a set of frames or samples, corresponding to a sample of the data stream. For example, a corresponding ML model may be run on every N-th frame or sample, or the parallel processing module 404 may operate on every K-th batch of frames or samples.

In some examples, the streaming server 124 automatically selects a number of processors to be allocated to the parallel processing module 404 based on factors such as the number of processors available overall (i.e., the pool size), latency budget considerations, the number of streams being streamed simultaneously by the streaming server 124, characteristics of the raw stream data (i.e., the frames-per-second or FPS value), resolution (for a frame) or sample rate (for an audio sample)), data processing algorithm attributes such as the run time or speed of a ML model of a single frame or sample, a requirement that frame-level processing should be followed by a post-processing step that operates on frame sequences, and so forth.

In some examples, the processing server 206 examines the run time of a data processing algorithm on an example single processor unit, such as a CPU, for a relevant unit of input raw data, such as a single video frame or a single audio sample. In some examples, if the processing server 206 determines that the run time, or the speed, of the target processing algorithm is less than required to maintain the FPS value of an input video signal, the processing server 206 can scale up parallel processing resources by provisioning a number N of processors where N is sufficient to allow for fast enough processing of the input raw data, given a particular latency budget. For example, if a video stream runs at 60 FPS, and the model inference speed is 10 FPS using a single given processor, the processing server 206 can use 6 processors of the same type and bring the overall FPS of the processing server 206 up to 60 FPS (for example, as long as an available latency budget is 1 second or greater).

In some examples, the parallel processing module 404 uses a GPU architecture and can therefore efficiently process multiple frames at once. In some examples, the parallel processing module 404 routes the raw stream data to an external service, such as an inference server. In some examples, the parallel processing module 404 receives inference or analysis results such as predictions or augmented or transformed stream data from the external service. In such examples, the data processing operations are performed externally to the processing server 206.

In some examples, the applied data processing methods are such that obtaining an accurate analysis of a frame N depends on also analyzing the content of adjacent, or close-by, data stream frames, such as frames inside one or more K-length windows, where K is a predetermined constant. For example, for K=7, a data processing operation for frame N may need to consider the content of frames N−3, N−2, N−1, N, N+1, N+2, N+3. In some examples, a window is centered on a current frame N, while in others, the window refers to a set of preceding frames or to a set of subsequent frames. In some examples, while K refers to the maximum length of a window, only a sample of the frames (not necessarily consecutive) inside a K-length window need be analyzed. In some examples, a sequential processing module 418 takes as input the output of parallel processing module 404 (e.g., frame output 412, frame output 414, frame output 416, and so forth). In some examples, the sequential processing module 418 uses the parallelizable raw output of the parallel processing module 404 to perform cross-frame or cross-sample analysis, smoothing, or integration. In some examples, the sequential processing module 418 takes as input raw data frames, such as frame 406, frame 408, frame 410.

In some examples, the AI module 302 starts with a predetermined latency budget, for example, indicating that the one or more transformations applied to the livestream can add up to K seconds to the livestream, where K is a predetermined constant (for example, K=3 secs). If the desired transformation can be accomplished at the level of individual video frames or audio samples, the processing server 206 can allocate N processing units (CPU units, GPU units, etc.) to a parallel processing phase by the parallel processing module 404, where N is automatically determined based on at least a predetermined run time or speed of a desired model for an individual sample. If the desired transformation uses a mix of sample-level data processing as well as sequential processing, the processing server 206 can allocate M processing units (e.g., CPU units, GPU units, etc.), where M is large enough to allow for a remainder latency budget to be allocated to sequential processing.

In one illustrative example, the AI module 302 has an overall latency budget of 3 seconds in the context of applying a desired augmentation to a live stream. The processing server 206, for example, via the AI module 302, may allocate 3 GPUs to the parallel processing module 404. As an illustrative example, if each GPU can process 1 second of signal (for example, 1 second of video) in 0.5 seconds, the AI module 302 is then able to process 3 seconds of incoming signal (here, 3 seconds of video) in 0.5 seconds, which leads to a remainder latency budget of 2.5 seconds, which can be consumed by a sequential processing step as implemented at the sequential processing module 418.

In one example, the AI module 302 has a goal of identifying and tracking a target rectangular object on-screen (e.g., a brand logo, or an area where a brand logo could potentially be displayed) using an identification step and a tracking step. The identification step examines a frame and identifies candidates for corners. The tracking step takes as input identification information obtained from the current, prior, and possibly subsequent frames, and uses the input identification information to reconcile the identified corner candidates and produce a final best estimate of the true corner positions. In some examples, tracking of one or more objects may use a Kalman Filter, a particle filter, and so forth. By taking into account information from nearby frames, the tracker achieves a more realistic and smoother localization that is more robust to noise, identification jitter, and occlusion. In some examples, the AI module 302 performs the identification step (extracting corner candidates) using the parallel processing module 404. In some examples, the AI module 302 performs the tracking step using the sequential processing module 418, which takes as input the output of the identification step. The tracking step comprises, for example, generating final corner estimates based on the identified corner candidates and using information from nearby frames, as mentioned above. Once the final corner estimates are generated, the application of the transformation can be completed.

In some examples, the processing server 206 is performing a transcription task, or voice-to-text task. In order to boost accuracy, eliminate ambiguity and/or render the system more robust to noise and misinterpretation due to audio or interpretation artifacts, sounds can be processed in the context of previous and follow up sounds. In some examples, the processing server 206 seeks to detect certain types of transformations taking place in a video stream (e.g., such as specific changes to the appearance of a video game character, etc.), which may require the local analysis of a set of video frames rather than independent analysis of each of the frames. In some examples, the processing server 206 is performing a video analysis or audio analysis task that requires temporal coherence. In the case of a user streaming a video game, such a task can involve tracking and highlighting enemies or specific moving game assets for the benefit of viewers; identifying, and making visible (to the viewers), semi-hidden objects, characters, or obstacles that persist across a number of frames; identifying interesting moments in the game, such as efficient obstacle-overcoming actions or solutions to puzzles; and so forth. In an example of a stream of an athletic event such as a game or competition, such a task can involve tracking specific players or contestants, tracking and highlighting the trajectory of a ball (or the ball itself), and so forth.

In some examples, the AI module 302 uses object detection and/or recognition models. For example, such models can be used to identify objects of a pre-specified type, such as walls, doors, and contiguous areas where branded material such as virtual signage or products may potentially be placed. In some examples, this can be accomplished by the use of an AR filter for virtual product placement. Additionally, the system can identify appearances of known products from product categories of interest to a customer (e.g., products organically used by a character or an avatar in a stream). The AI module 302 may use the object detection and/or recognition models to detect brand logos, characters, or assets of interest, real-life objects, players or entities of interest, and so forth.

In some examples, the AI module 302 uses graphical processing or image processing models such as texture creation, customization, and application models, inpainting and/or recolorization models, models applying different types of stylization effects and/or filters such as augmented reality (AR) or extended reality (XR) filters, and so forth. For example, branded material provided by a customer can be adapted or modified (e.g., resized, recolorized, modified by applying an "aging" filter if the target goal is insertion into a livestream of a game with a historical setting, or modified by applying a "camo" or "military" look if the target goal is insertion into a military simulation-type game, and so forth). In some examples, a detected or recognized object of a specific type from an original video may be transformed by applying a custom, branded content filter or augmentation, which re-textures the object as an advertisement.

In some examples, the AI module 302 applies transformations (such as stylization effects, filters, and so forth) to transform the appearance of the streamer into an avatar for entertainment purposes or promotional purposes. In some examples, the avatar is a unique or custom image. In some examples, the avatar is created based on a character from a video game, television show, movie, and so forth.

In some examples, the AI module 302 uses object detection and/or recognition algorithms, and/or audio processing, and speech transcription and analysis algorithms in order to protect against unwanted content. For example, undesirable content such as gore, nudity, obscenity, and so forth can be detected in real-time; upon detecting video frames or audio samples corresponding to such content, the system may apply one or more transformations to the affected video frames and audio samples, which could result in either blocking, covering, or replacing the affected content portions. In some examples, the streaming server may detect that affected portions of the stream may be able to be entirely removed without affecting the overall coherence of the stream. If the streaming server automatically determines that removing such portions may be more effective or more efficient than blocking or covering the affected content, affected video frames and/or audio samples may be filtered out.

In some examples, such unwanted content can refer to copyrighted audio: for example, consider the case of a parent broadcasting a kid's little league game. Audible on stream, a nearby person is playing copyrighted music. By identifying and eliminating copyrighted audio, the system allows the user to broadcast the primary content without copyright-infringing concerns and without having to mute the entire channel for the duration of the copyrighted audio snippet.

In some examples, the AI module 302 may use transcription and/or translation models in order to perform live translation or provide subtitles or dubbing. For example, a streamer may be speaking a first language (like Spanish), but the system may change the spoken language, on demand from an end platform or client, to German. In some examples, the AI module 302 may apply a transformation to a video stream as well, causing the visual representation of a speaker to agree with translated or dubbed audio. For example, if the spoken language is changed from Spanish to German and a corresponding speaker is visible, the AI module 302 may transform the appearance or features of the speaker in order to make it appear as if they are uttering the translated words. In this example, such a transformation can consist of making it appear as if the lips of a speaker are moving in a manner congruent with uttering translated German content.

Figure 5:
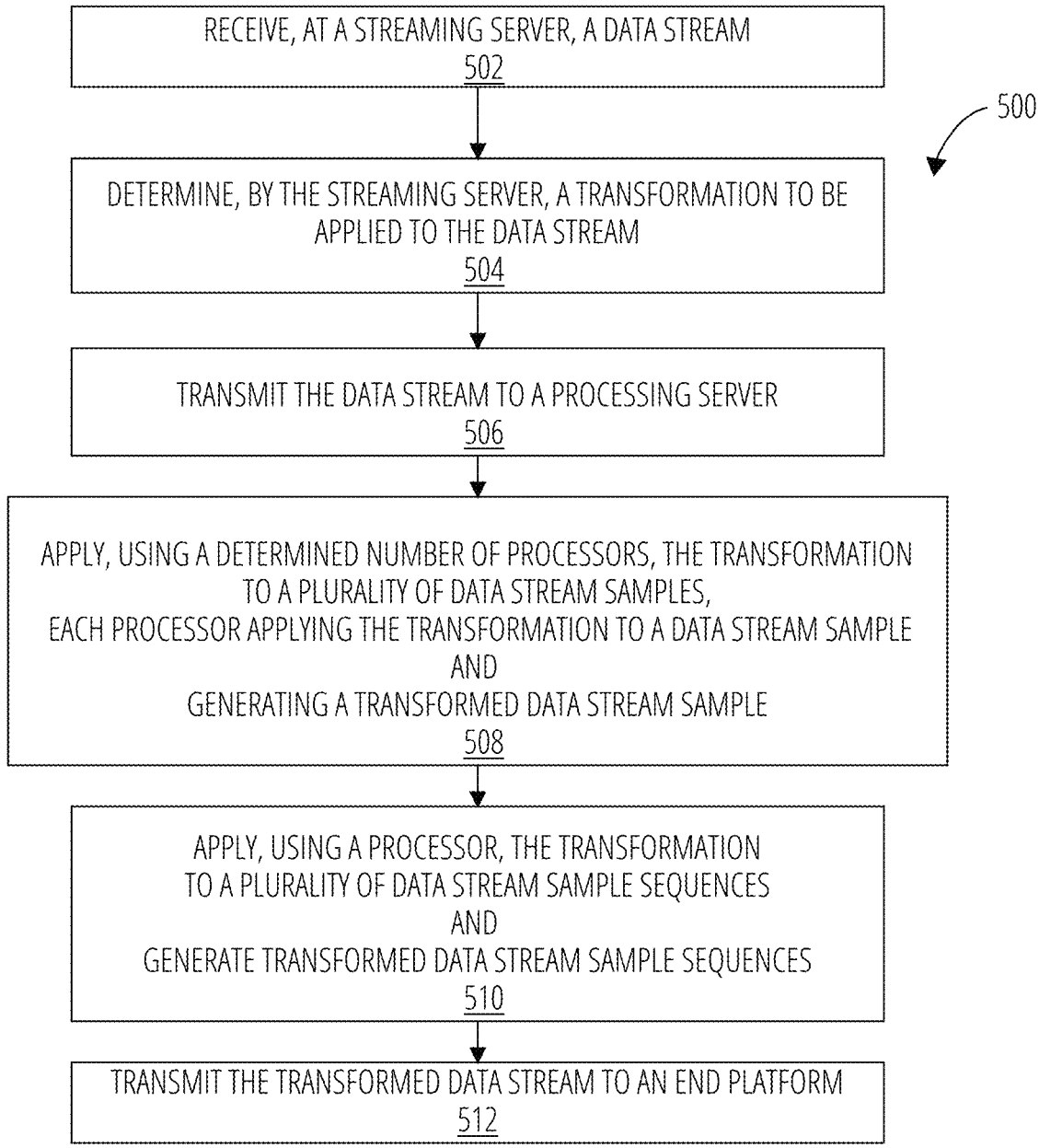
FIG. 5 is a flowchart illustrating a method for livestream augmentation, according to some examples.

FIG. 5 is a flowchart illustrating a method 500 for livestream augmentation, as implemented by a stream augmentation system 100, according to some examples.

At operation 502, the stream augmentation system 100 receives, for example, at streaming server 124, a data stream. At operation 504, the stream augmentation system 100 determines, at streaming server 124, a transformation to be applied to the data stream (see FIG. 2 for more details). At operation 506, the stream augmentation system 100 transmits the data stream for processing to a processing server 206.

At operation 508, the stream augmentation system 100 (for example, using the processing server 206) applies the transformation, using an automatically determined number of processors, to a plurality of samples of the data streams. Data stream samples can be individual video frames, audio samples, and so on. The application of the transformation is done in parallel, with each processor of the determined number of processors applying the target transformation to a corresponding data stream sample and generating a transformed data stream sample (see FIG. 2 for examples of potentially requested transformations). In some examples, as further detailed below, the application of the transformation at this operation is partial, rather than total. For example, the processing server 206 executes one or more necessary steps as part of operation 508 (during a parallel processing phase), while other processing steps are executed as part of operation 510 (during a sequential processing phase), or as part of other operations.

At operation 510, the stream augmentation system 100 (for example, using the processing server 206), applies the transformation to a plurality of sequences of data stream samples, thereby generating transformed data stream sample sequences. In some examples, the data stream samples in these sequences are outputs of the parallel processing phase in operation 508. Operation 510 corresponds to a sequential processing phase which, in some examples, is part of applying a transformation (or a portion of a transformation) to a data stream. For example, neighboring frames may need to be collectively analyzed (for example, postprocessed), in addition to being analyzed at an individual level. An illustrative example of an object identifying and tracking task that benefits from such sequential processing is given in the description of FIG. 4.

Finally, at operation 512, the stream augmentation system 100 transmits the transformed data stream to an end platform. In some examples, applying the transformation(s) and using the transformed data stream(s) is internally done by a platform or service, such as a streaming service providing enhanced or transformed data stream(s) to end viewers.

Figure 6:
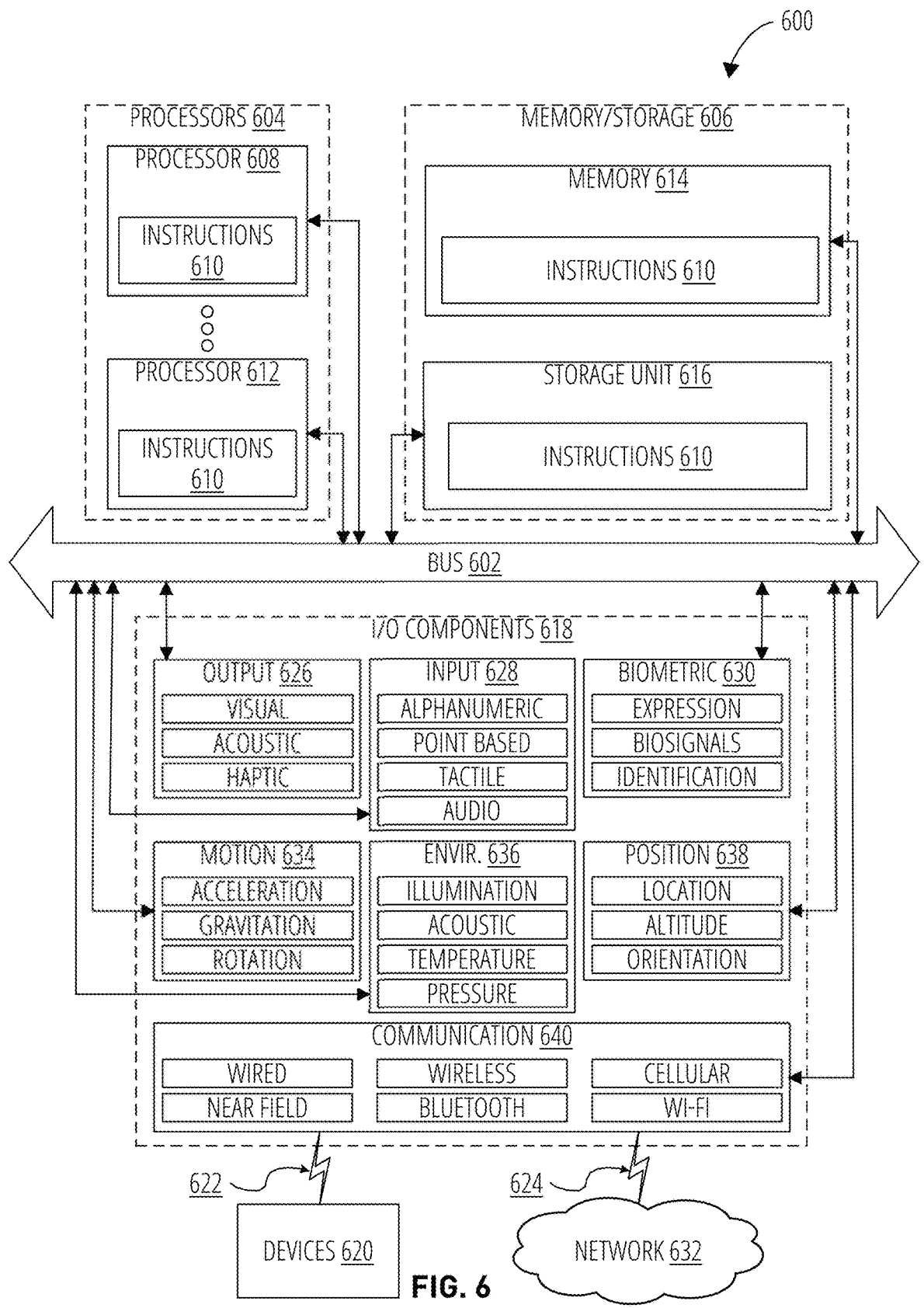
FIG. 6 is a block diagram illustrating components of a machine, according to some examples, able to read instructions from a machine-readable medium and perform any one or more of the methodologies discussed herein.

FIG. 6 is a block diagram illustrating components of a machine 600, according to some example embodiments, able to read instructions from a machine-readable medium (e.g., a machine-readable storage medium or computer-readable storage medium, the medium being non-transitory, etc.) and perform any one or more of the methodologies discussed herein. Specifically, FIG. 6 shows a diagrammatic representation of the machine 600 in the example form of a computer system, within which instructions 610 (e.g., software, a program, an application, an applet, an app, or other executable code) for causing the machine 600 to perform any one or more of the methodologies discussed herein may be executed. As such, the instructions 610 may be used to implement modules or components described herein. The instructions 610 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 610, sequentially or otherwise, that specify actions to be taken by machine 600. Further, while only a single machine 600 is illustrated, the term "machine" shall also be taken to include a collection of machines that individually or jointly execute the instructions 610 to perform any one or more of the methodologies discussed herein.

The machine 600 may include processors 604, memory/storage 606, and input/output (I/O) components 618, which may be configured to communicate with each other such as via a bus 602. The memory/storage 606 may include a memory 614, such as a main memory, or other memory storage, and a storage unit 616, both accessible to the processors 604 such as via the bus 602. The storage unit 616 and memory 614 store the instructions 610 embodying any one or more of the methodologies or functions described herein. The instructions 610 may also reside, completely or partially, within the memory 614 within the storage unit 616, within at least one of the processors 604 (e.g., within the processor's cache memory), or any suitable combination thereof, during execution thereof by the machine 600. Accordingly, the memory 614, the storage unit 616, and the memory of processors 604 are examples of machine-readable media.

The I/O components 618 may include a wide variety of components to receive input, provide output, produce output, transmit information, exchange information, capture measurements, and so on. The specific I/O components 618 that are included in a particular machine 600 will depend on the type of machine. For example, portable machines such as mobile phones will likely include a touch input device or other such input mechanisms, while a headless server machine will likely not include such a touch input device. It will be appreciated that the I/O components 618 may include many other components that are not shown in FIG. 6. The I/O components 618 are grouped according to functionality merely for simplifying the following discussion and the grouping is in no way limiting. In various example embodiments, the I/O components 618 may include output components 626 and input components 628. The output components 626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input I/O components 628 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 618 may include biometric components 630, motion components 634, environmental components 636, or position components 638 among a wide array of other components. For example, the biometric components 630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 634 may include acceleration sensor components (e.g., accelerometer), gravitation sensor components, rotation sensor components (e.g., gyroscope), and so forth. The environmental components 636 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 638 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 618 may include communication components 640 operable to couple the machine 600 to a network 632 or devices 620 via coupling 624 and coupling 622, respectively. For example, the communication components 640 may include a network interface component or other suitable device to interface with the network 632. In further examples, communication components 640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 620 may be another machine or any of a wide variety of peripheral devices (e.g., a peripheral device coupled via a Universal Serial Bus (USB)).

Moreover, the communication components 640 may detect identifiers or include components operable to detect identifiers. For example, the communication components 640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as, location via Internet Protocol (IP) geo-location, location via Wi-Fi® signal triangulation, location via detecting a NFC beacon signal that may indicate a particular location, and so forth.

Figure 7:
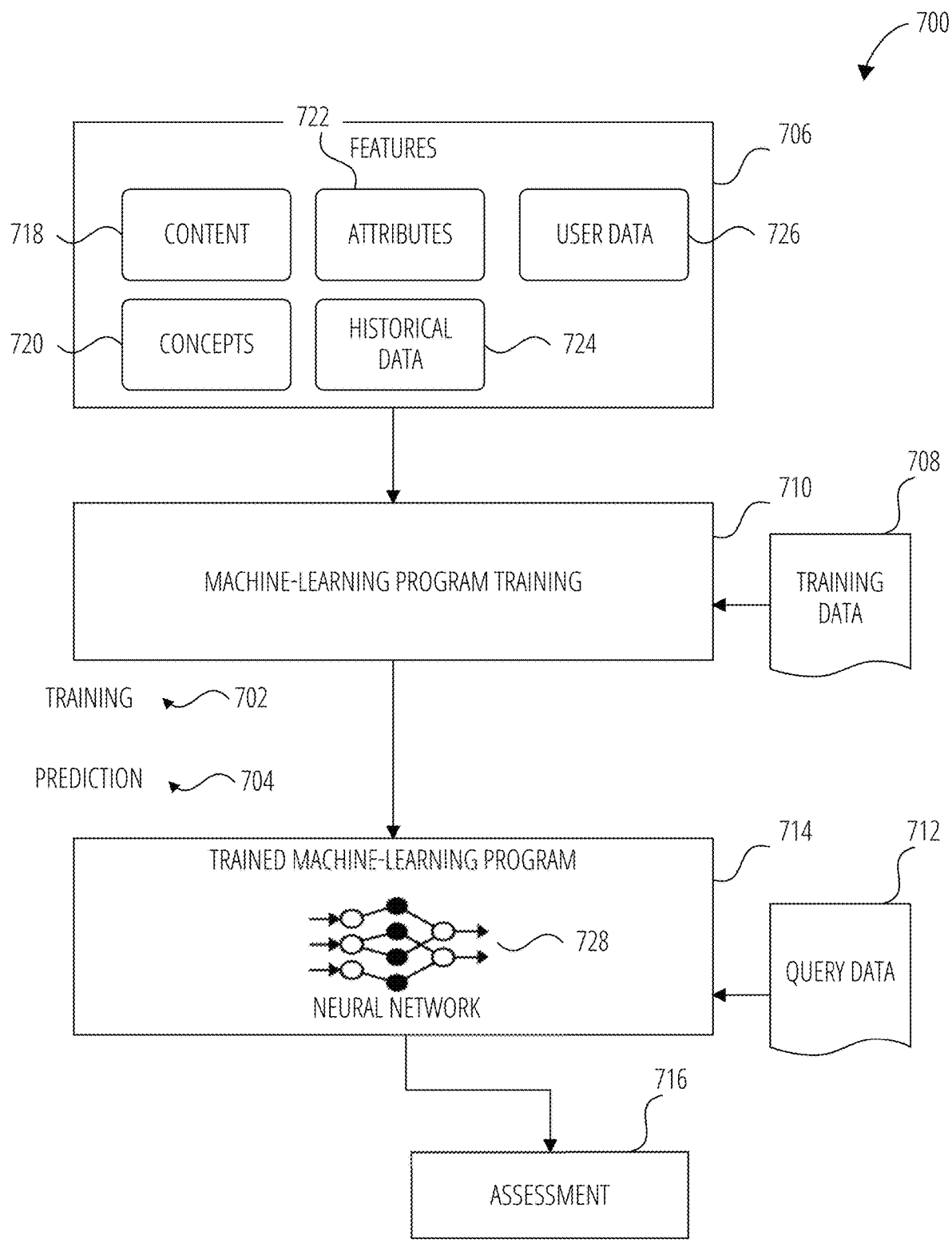
FIG. 7 is a block diagram showing a machine-learning (ML) program according to some examples.

FIG. 7 is a block diagram showing a machine-learning program 700, according to some examples. The machine-learning programs 700, also referred to as machine-learning algorithms or tools, are used to train ML models, which can be used as described at least in FIG. 3 and FIG. 4 of the disclosure herein.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine-learning tools operate by building a model from example training data 708 in order to make data-driven predictions or decisions expressed as outputs or assessments (e.g., assessment 716). Although examples are presented with respect to a few machine-learning tools, the principles presented herein may be applied to other machine-learning tools.

In some examples, different machine-learning tools may be used. For example, Logistic Regression (LR), Naive-Bayes, Random Forest (RF), Gradient Boosted Decision Trees (GBDT), neural networks (NN), matrix factorization, and Support Vector Machines (SVM) tools may be used. In some examples, one or more ML paradigms may be used: binary or n-ary classification, semi-supervised learning, etc. In some examples, time-to-event (TTE) data will be used during model training. In some examples, a hierarchy or combination of models (e.g., stacking, bagging) may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning program 700 supports two types of phases, namely a training phase 702 and prediction phase 704. In a training phase 702, supervised learning, unsupervised, or reinforcement learning may be used. For example, the machine-learning program 700 (1) receives features 706 (e.g., as structured or labeled data in supervised learning) and/or (2) identifies features 706 (e.g., unstructured or unlabeled data for unsupervised learning) in training data 708. In a prediction phase 704, the machine-learning program 700 uses the features 706 for analyzing input (or query) data 712 to generate outcomes or predictions, as examples of an assessment 716.

In the training phase 702, feature engineering is used to identify features 706 and may include identifying informative, discriminating, and independent features for the effective operation of the machine-learning program 700 in pattern recognition, classification, and regression. In some examples, the training data 708 includes labeled data, which is known data for pre-identified features 706 and one or more outcomes. Each of the features 706 may be a variable or attribute, such as individual measurable property of a process, article, system, or phenomenon represented by a data set (e.g., the training data 708). Features 706 may also be of different types, such as numeric features, strings, and graphs, and may include one or more of content 718, concepts 720, attributes 722, historical data 724 and/or user data 726, merely for example.

In training phases 702, the machine-learning program 700 uses the training data 708 to find correlations among the features 706 that affect a predicted outcome or assessment 716.

With the training data 708 and the identified features 706, the machine-learning program 700 is trained during the training phase 702 at machine-learning program training 710. The machine-learning program 700 appraises values of the features 706 as they correlate to the training data 708. The result of the training is the trained machine-learning program 714 (e.g., a trained or learned model).

Further, the training phases 702 may involve machine learning (such as deep learning), in which the training data 708 is structured (e.g., labeled during preprocessing operations), and the trained machine-learning program 714 implements a relatively simple neural network 728 (or one of other machine learning models, as described herein) capable of performing, for example, classification and clustering operations. In other examples, the training phase 702 may involve training data 708 that is unstructured, and the trained machine-learning program 714 implements a deep neural network 728 that is able to perform both feature extraction and classification/clustering operations.

A neural network 728 generated or trained during the training phase 702 and implemented within the trained machine-learning program 714, may include a hierarchical (e.g., layered) organization of neurons. For example, neurons (or nodes) may be arranged hierarchically into a number of layers, including an input layer, an output layer, and multiple hidden layers. The layers within the neural network 728 can have one or many neurons, and the neurons operationally compute a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which define the influence of the input from a transmitting neuron to a receiving neuron.

In some examples, the neural network 728 may also be one of a number of different types of neural networks, including a single-layer feed-forward network, an Artificial Neural Network (ANN), a Recurrent Neural Network (RNN), a symmetrically connected neural network, an unsupervised pre-trained network, a Convolutional Neural Network (CNN), a Recursive Neural Network (RNN), a network with a transformer architecture, and so forth (merely for example).

During prediction phases 704 the trained machine-learning program 714 is used to perform an assessment. Query data 712 is provided as an input to the trained machine-learning program 700, and the trained machine-learning program 714 generates the assessment 716 as output, responsive to receipt of the query data 712.

A trained neural network model (e.g., a trained machine learning trained machine-learning program 714 using a neural network 728) may be stored in a computational graph format, according to some examples. An example computational graph format is the Open Neural Network Exchange (ONNX) file format, which is an open, flexible standard for storing models that allows reusing models across deep learning platforms/tools and deploying models in the cloud (e.g., via ONNX runtime).

In some examples, the ONNX file format corresponds to a computational graph in the form of a directed graph whose nodes (or layers) correspond to operators and whose edges correspond to tensors. In some examples, the operators (or operations) take the incoming tensors as inputs, and output result tensors, which are in turn used as inputs by their children.

In some examples, trained neural network models (e.g., examples of trained machine-learning programs 714) developed and trained using frameworks such as TensorFlow, Keras, PyTorch, and so on can be automatically exported to the ONNX format using framework-specific export functions. For instance, PyTorch allows the use of a torch.export (trainedModel, outputFile ( . . . )) function to export a trained model ready to be run to a file using the ONNX file format. Similarly, TensorFlow and Keras allow the use of the tf2onnx library for converting trained models to the ONNX file format, while Keras also allows the use of keras2onnx for the same purpose.

In example embodiments, one or more AI agents, such as one or more machine-learned algorithms or models and/or a neural network of one or more machine-learned algorithms or models may be trained iteratively (e.g., in a plurality of stages) using a plurality of sets of input data. For example, a first set of input data may be used to train one or more of the artificial agents. Then, the first set of input data may be transformed into a second set of input data for retraining the one or more AI agents. The continuously updated and retrained AI agents may then be applied to subsequent novel input data to generate one or more of the outputs described herein.

Examples

Example 1 is a system comprising a memory, and at least one hardware processor to perform operations comprising: receiving, at a streaming server, a data stream; determining, by the streaming server, a transformation to be applied to the data stream; upon determining the transformation to be applied to the data stream: transmitting the data stream to a processing server; determining a number of processors based on a latency budget value and an attribute value associated with the transformation; applying, at the processing server using the determined number of processors, the transformation to the data stream; and generating, by the processing server, a transformed data stream for use by a platform.

In Example 2, the subject matter of Example 1 includes the data stream being a multimedia stream, a video stream, or an audio stream.

In Example 3, the subject matter of Example 2 includes: wherein the data stream is a multimedia stream and the operations further comprise applying, at the processing server, a demultiplexing operation to the data stream, the demultiplexing operation to generate a plurality of separate data streams; applying the transformation to the data stream comprises applying the transformation to one or more of the plurality of separate data streams, and generating one or more separate transformed data streams; and the operations further comprise applying, at the processing server, a multiplexing operation to the one or more separate transformed data streams.

In Example 4, the subject matter of Examples 1-3 includes: wherein applying, by the processing server, the transformation to the data stream comprises applying in parallel, using the determined number of processors, the transformation to a plurality of data stream samples, each processor of the determined number of processors applying the transformation to a data stream sample of the plurality of data stream samples and generating a transformed data stream sample.

In Example 5, the subject matter of Examples 1~4 includes: wherein applying, by the processing server, the transformation to the data stream comprises applying, using a processor, one or more processing steps associated with the transformation to each of a plurality of data stream sample sequences.

In Example 6, the subject matter of Examples 1-5 includes, wherein: applying the transformation to a data stream sample comprises applying a machine learning (ML) model to a data stream sample; and the attribute value associated with the transformation corresponds to a run time of the ML model applied to one data stream sample.

In Example 7, the subject matter of Examples 1-6 includes: wherein determining a transformation to be applied to the data stream comprises receiving a trigger from an API, the trigger being one of at least a financial transaction associated with the transformation or a policy associated with the transformation.

In Example 8, the subject matter of Examples 1-7 includes: wherein the transformation to be applied to the data stream is one of at least a branded content augmentation, a content blocker, an AR filter, a translation filter, or a texture transformation.

In Example 9, the subject matter of Examples 1-8 includes: the operations further comprising: determining, at the streaming server, an end to the transformation to be applied to the data stream; responsive to determining the end to the transformation, bypassing the processing server and forwarding the data stream to the platform.

In Example 10, the subject matter of Examples 1-9 includes: wherein the operations further comprise: determining, at the streaming server, that the transformation is associated with a target platform of a plurality of platforms; generating, at the processing server, a plurality of data stream copies; applying, at the processing server, the transformation to one data stream copy of the plurality of data stream copies; transmitting the transformed data stream copy to the target platform; transmitting each of the remaining data stream copies to a respective one of the plurality of platforms.

Example 11 is at least one machine-readable medium including instructions that, when executed by processing circuitry, cause the processing circuitry to perform operations to implement of any of Examples 1-10.

Example 12 is an apparatus comprising means to implement any of Examples 1-10.

Example 13 is a method to implement any of Examples 1-10.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"FILTER" in this context can refer to an overlay displayed as overlaid on an image, video, audio signal, or data stream, for example during presentation to a recipient user. A filter can also refer to a transformation applied to an image, video, audio signal or data stream. Filters may be of various types, a non-exhaustive list including content filters, media filters, translation filters, texture or texture transformation filters, geolocation filters (e.g., geo-filters) based on geographic location (e.g., geo-filters can be specific to a neighborhood or special location and can be based on geolocation information, for example determined by a Global Positioning System (GPS) unit), and so forth. Filters can take the form of augmented reality (AR) or extended reality (XR) filters, referring for example to real-time special effects or sounds that may be applied to an image, video, audio signal or data stream.

"EXTENDED REALITY" or (XR) is an umbrella term encapsulating Augmented Reality (AR), Virtual Reality (VR), Mixed Reality (MR), and everything in between. For the sake of simplicity, examples herein are described using one type of system, such as XR or AR. However it is appreciated that other types of systems apply.

"TIME DELAYED NEURAL NETWORK (TDNN)" in this context is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A system comprising:
a memory; and
at least one hardware processor configured to perform operations comprising:
receiving, at a streaming server, a data stream;
receiving, at the streaming server, a request to apply a transformation to the data stream;
upon receiving the request to apply the transformation to the data stream:
determining a first transformation attribute value associated with a sample of the data stream, wherein samples of the data stream are processed in parallel;
determining a second transformation attribute value associated with a sequence of processed data stream samples;
transmitting the data stream to a processing server;
determining a number of processors based on a latency budget value, the first transformation attribute value and the second transformation attribute value;
applying, at the processing server using the determined number of processors, the transformation to the data stream; and
generating, by the processing server, a transformed data stream for use by a platform;
determining, at the streaming server, an end to applying the transformation to the data stream, the determining comprising detecting a termination trigger; and
responsive to determining the end to applying the transformation, bypassing the processing server and forwarding the data stream to the platform, the data stream no longer being transformed.

2. The system of claim 1, wherein the data stream is a multimedia stream, a video stream, or an audio stream.

3. The system of claim 2, wherein the data stream is a multimedia stream and the operations further comprise applying, at the processing server, a demultiplexing operation to the data stream, the demultiplexing operation to generate a plurality of separate data streams;
applying the transformation to the data stream comprises applying the transformation to one or more of the plurality of separate data streams, and generating one or more separate transformed data streams; and
the operations further comprise applying, at the processing server, a multiplexing operation to the one or more separate transformed data streams.

4. The system of claim 1, wherein applying, by the processing server, the transformation to the data stream comprises applying in parallel, using the determined number of processors, a first set of processing steps of the transformation to a plurality of data stream samples, each processor of the determined number of processors applying the first set of processing steps to a data stream sample of the plurality of data stream samples and generating a processed data stream sample.

5. The system of claim 4, wherein applying, by the processing server, the transformation to the data stream comprises applying, using a processor, a second set of processing steps of the transformation to each of a plurality of data stream sample sequences, the sequences comprising data stream samples processed based on the first set of processing steps.

6. The system of claim 1, wherein:
applying the transformation to a data stream sample comprises applying a machine learning (ML) model to a data stream sample; and
the first attribute value associated with the transformation corresponds to a run time of the ML model applied to one data stream sample.

7. The system of claim 1, wherein receiving the request to apply the transformation to the data stream further comprises receiving a trigger from an application programming interface (API), the trigger being one of at least a financial transaction associated with the transformation or a filtering policy specifying the transformation.

8. The system of claim 1, wherein the transformation to be applied to the data stream is one of at least a branded content augmentation, a content blocker, an augmented reality (AR) filter, a translation filter, or a texture transformation.

9. The system of claim 1, wherein the operations further comprise:
determining, at the streaming server, that the transformation is associated with a target platform of a plurality of platforms;
generating, at the processing server, a plurality of data stream copies;
applying, at the processing server, the transformation to one data stream copy of the plurality of data stream copies;
transmitting the transformed data stream copy to the target platform;
transmitting each of the remaining data stream copies to a respective one of the plurality of platforms.

10. A method comprising:
receiving, at a streaming server, a data stream;
receiving, at the streaming server, a request to apply a transformation to the data stream;
upon receiving the request to apply the transformation to the data stream:
determining a first transformation attribute value associated with a sample of the data stream, wherein samples of the data stream are processed in parallel;
determining a second transformation attribute value associated with a sequence of processed data stream samples;
transmitting the data stream to a processing server;
determining a number of processors based on a latency budget value, the first transformation attribute value and the second transformation attribute value;
applying, at the processing server using the determined number of processors, the transformation to the data stream; and
generating, by the processing server, a transformed data stream for use by a platform;
determining, at the streaming server, an end to applying the transformation to the data stream, the determining comprising detecting a termination trigger; and
responsive to determining the end to applying the transformation, bypassing the processing server and forwarding the data stream to the platform, the data stream no longer being transformed.

11. The method of claim 10, wherein the data stream is a multimedia stream, a video stream, or an audio stream.

12. The method of claim 11, wherein the data stream is a multimedia stream and the method further comprises applying, at the processing server, a demultiplexing operation to the data stream, the demultiplexing operation to generate a plurality of separate data streams;

applying the transformation to the data stream comprises applying the transformation to one or more of the plurality of separate data streams, and generating one or more separate transformed data streams; and the method further comprises applying, at the processing server, a multiplexing operation to the one or more separate transformed data streams.

13. The method of claim 10, wherein applying, by the processing server, the transformation to the data stream comprises applying in parallel, using the determined number of processors, a first set of processing steps of the transformation to a plurality of data stream samples, each processor of the determined number of processors applying the first set of processing steps to a data stream sample of the plurality of data stream samples and generating a processed data stream sample.

14. The method of claim 13, wherein applying, by the processing server, the transformation to the data stream comprises applying, using a processor, a second set of processing steps of the transformation to each of a plurality of data stream sample sequences, the sequences comprising data stream samples processed based on the first set of processing steps.

15. The method of claim 10, wherein:

applying the transformation to a data stream sample comprises applying a machine learning (ML) model to a data stream sample; and the first attribute value associated with the transformation corresponds to a run time of the ML model applied to one data stream sample.

16. The method of claim 10, wherein receiving the request to apply the transformation to the data stream further comprises receiving a trigger from an application programming interface (API), the trigger being one of at least a financial transaction associated with the transformation or a filtering policy specifying the transformation.

17. The method of claim 10, wherein the transformation to be applied to the data stream is one of at least a branded content augmentation, a content blocker, an augmented reality (AR) filter, a translation filter, or a texture transformation.

18. A non-transitory computer-readable storage medium, the computer-readable storage medium including instructions that when executed by a computer, cause the computer to receive, at a streaming server, a data stream;

receive, at the streaming server, a request to apply a transformation to the data stream;

upon receiving the request to apply the transformation to the data stream:

determine a first transformation attribute value associated with a sample of the data stream, wherein samples of the data stream are processed in parallel;

determine a second transformation attribute value associated with a sequence of processed data stream samples;

transmit the data stream to a processing server;

determine a number of processors based on a latency budget value, the first transformation attribute and the second transformation attribute value;

apply, at the processing server using the determined number of processors, the transformation to the data stream; and generate, by the processing server, a transformed data stream for use by a platform;

determine, at the streaming server, an end to applying the transformation to the data stream, the determining comprising detecting a termination trigger; and responsive to determining the end to applying the transformation, bypass the processing server and forwarding the data stream to the platform, the data stream no longer being transformed.

* * * * *